(12) United States Patent
Min

(10) Patent No.: US 11,031,659 B2
(45) Date of Patent: Jun. 8, 2021

(54) BATTERY MODULE

(71) Applicant: LG Chem, Ltd., Seoul (KR)

(72) Inventor: Kyoung-Choon Min, Daejeon (KR)

(73) Assignee: LG CHEM, LTD., Seoul (KR)

( * ) Notice: Subject to any disclaimer, the term of this patent is extended or adjusted under 35 U.S.C. 154(b) by 146 days.

(21) Appl. No.: 16/478,656

(22) PCT Filed: Jul. 4, 2018

(86) PCT No.: PCT/KR2018/007592
§ 371 (c)(1),
(2) Date: Jul. 17, 2019

(87) PCT Pub. No.: WO2019/066213
PCT Pub. Date: Apr. 4, 2019

(65) Prior Publication Data
US 2019/0372080 A1    Dec. 5, 2019

(30) Foreign Application Priority Data

Sep. 29, 2017    (KR) .................. 10-2017-0128194

(51) Int. Cl.
*H01M 50/531*    (2021.01)
*H01M 50/20*    (2021.01)
*H01M 10/42*    (2006.01)

(52) U.S. Cl.
CPC ..... *H01M 50/531* (2021.01); *H01M 10/4207* (2013.01); *H01M 50/20* (2021.01)

(58) Field of Classification Search
CPC .......... H01M 2/26; H01M 2/10; H01M 10/42; H01M 50/10; H01M 50/102
See application file for complete search history.

(56) References Cited

U.S. PATENT DOCUMENTS

| | | | |
|---|---|---|---|
| 2009/0123820 A1 | 5/2009 | Han | |
| 2012/0276419 A1* | 11/2012 | Park | H01M 50/543 429/7 |
| 2014/0186676 A1* | 7/2014 | Ebisawa | H01M 50/20 429/100 |
| 2015/0214532 A1 | 7/2015 | Nakayama et al. | |
| 2016/0093854 A1* | 3/2016 | Tyler | H01M 4/525 429/156 |

(Continued)

FOREIGN PATENT DOCUMENTS

| | | |
|---|---|---|
| EP | 2741344 A1 | 6/2014 |
| JP | H09147826 A | 6/1997 |

(Continued)

OTHER PUBLICATIONS

Extended European Search Report, dated May 27, 2020, for European Application No. 18661097.6.

*Primary Examiner* — Kenneth J Douyette

(74) *Attorney, Agent, or Firm* — Birch, Stewart, Kolasch & Birch, LLP

(57) ABSTRACT

Disclosed is a battery module, which includes a base plate; a plurality of battery cells disposed on the base plate; a plurality of sockets electrically connected to electrode leads of the battery cells; and a plurality of connecting bars configured to be inserted into a part of the plurality of sockets to allow the plurality of battery cells to be connected in a serial pattern or a combined serial and parallel pattern.

12 Claims, 5 Drawing Sheets

(56) References Cited

U.S. PATENT DOCUMENTS

2016/0301109 A1  10/2016  Peng et al.

FOREIGN PATENT DOCUMENTS

| JP | 2009-110855 A | 5/2009 |
| JP | 2009-231138 A | 10/2009 |
| JP | 2009-289613 A | 12/2009 |
| JP | 2010-009796 A | 1/2010 |
| JP | 2014-176152 A | 9/2014 |
| KR | 10-2009-0048860 A | 5/2009 |
| KR | 10-2013-0133557 A | 12/2013 |
| KR | 10-2015-0014572 A | 2/2015 |
| KR | 10-2016-0104051 A | 9/2016 |
| KR | 10-2017-0077467 A | 7/2017 |

* cited by examiner

BATTERY MODULE

CROSS-REFERENCES TO RELATED APPLICATIONS

This application is a U.S. national phase application, pursuant to 35 U.S.C. § 371, of PCT/KR2018/007592, filed Jul. 4, 2018, designating the United States, which claims priority to Korean Application No. 10-2017-0128194, filed Sep. 29, 2017. The entire contents of the aforementioned patent applications are incorporated herein by this reference.

TECHNICAL FIELD

The present application claims priority to Korean Patent Application No. 10-2017-0128194 filed on Sep. 29, 2017, the disclosures of which are incorporated herein by reference in its entirety.

The present disclosure relates to a battery module, and more particularly, to a battery module having a structure capable of easily changing a connection pattern among a plurality of battery cells.

BACKGROUND ART

Recently, along with the technology development of electric devices and electric vehicle, increase of the capacity of a secondary battery is demanded, and also a larger output voltage is required. Thus, in order to obtain a sufficient output voltage using the secondary battery, a plurality of secondary batteries may be connected in series.

However, if a plurality of secondary batteries are connected in series and used for a long time, the voltages of the secondary batteries may become different from each other. In addition, it may be more important to increase the total capacity of the secondary batteries than to increase the output voltage of the secondary batteries. If it is demanded to increase the overall capacity of the secondary batteries, a plurality of secondary batteries need to be connected in parallel.

As described above, a plurality of secondary batteries may be connected in series, in parallel, or a combination thereof, depending on the usage situation. In general, the electrical connection pattern of the plurality of secondary batteries is determined in the manufacturing process. In this case, even when there is a necessity to change the connection pattern during the use, it is not possible to change the connection pattern.

DISCLOSURE

Technical Problem

The present disclosure is designed to solve the problems of the related art, and therefore the present disclosure is directed to providing a battery module, which includes a plurality of battery cells and has a structure in which a user may freely change an electrical connection pattern of the plurality of battery cells, namely into a serial connection, a parallel connection, or a combination thereof.

However, the technical problem to be solved by the present disclosure is not limited to the above, and other objects not mentioned herein will be understood from the following description by those skilled in the art.

Technical Solution

In one aspect of the present disclosure, there is provided a battery module, comprising: a base plate; a plurality of battery cells disposed on the base plate; a plurality of sockets electrically connected to electrode leads of the battery cells; and a plurality of connecting bars configured to be inserted into a part of the plurality of sockets to allow the plurality of battery cells to be connected in a serial pattern or a combined serial and parallel pattern.

The base plate may include a plurality of conductive pads, and the sockets may be electrically connected to the electrode leads through the conductive pads.

The plurality of battery cells may be arranged to form two columns.

In a pair of battery cells arranged in the same row, electrode leads of the battery cell arranged in the first column and electrode leads of the battery cell arranged in the second column may extend in opposite directions.

The electrode leads of the battery cell arranged in the first column and the electrode leads of the battery cell arranged in the second column may be disposed alternately.

The sockets may include a first support electrically connected to the electrode leads of the battery cell arranged in the first column; and a second support electrically connected to the electrode leads of the battery cell arranged in the second column and electrically insulated from the first support.

Each of the first support and the second support may include a pair of sidewalls; and a connection portion configured to connect lower ends of the pair of sidewalls.

The connecting bars may be inserted between the pair of sidewalls of both the first support and the second support to electrically connect the first support and the second support.

The connecting bars may include a pair of flange portions formed at both side ends thereof to restrict a horizontal movement of the connecting bar; and an insert portion configured to connect the pair of flange portions and inserted between the pair of sidewalls.

The insert portion may have a width that corresponds to a distance between the pair of sidewalls.

Advantageous Effects

According to the present disclosure, in the battery module including a plurality of battery cells, a user may flexibly change an electrical connection pattern of the plurality of battery cells, namely into a serial connection, a parallel connection, or a combination thereof.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure should not be construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is merely a preferable example for the purpose of illustrations only, not intended to limit the scope of the disclosure, so it should be understood that other equivalents and modifications could be made thereto without departing from the scope of the disclosure.

A structure of a battery module according to an embodiment of the present disclosure will be described with reference to FIGS. 1 to 4.

Figure 1:
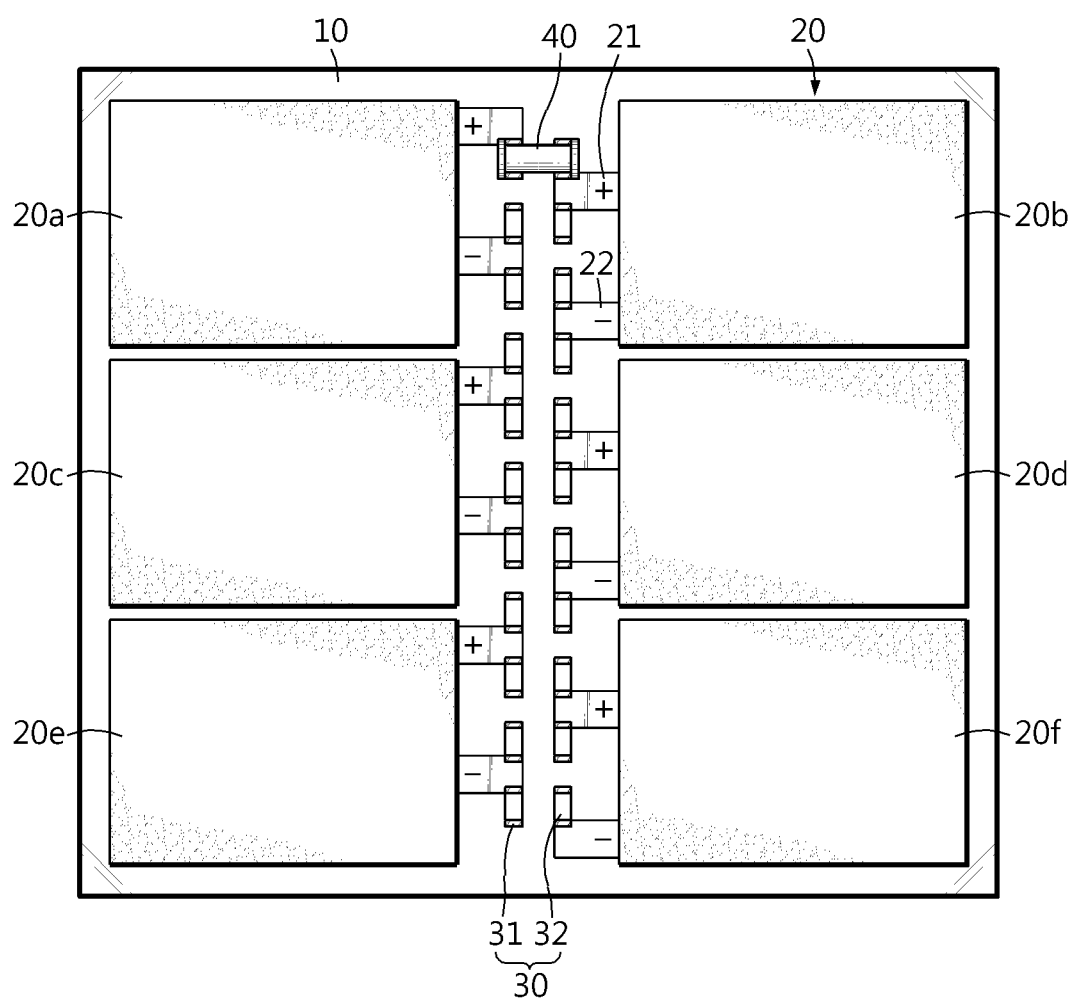
FIG. 1 is a plane view showing a battery module according to an embodiment of the present disclosure.
Figure 2:
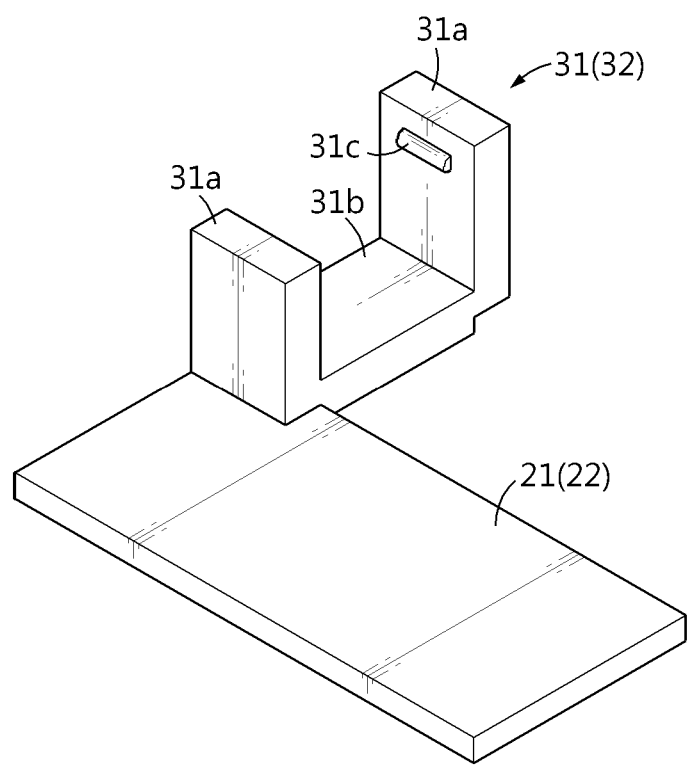
FIGS. 2 and 3 are diagrams showing a coupling pattern of an electrode lead and a single support of a socket employed at the battery module according to an embodiment of the present disclosure.
Figure 3:
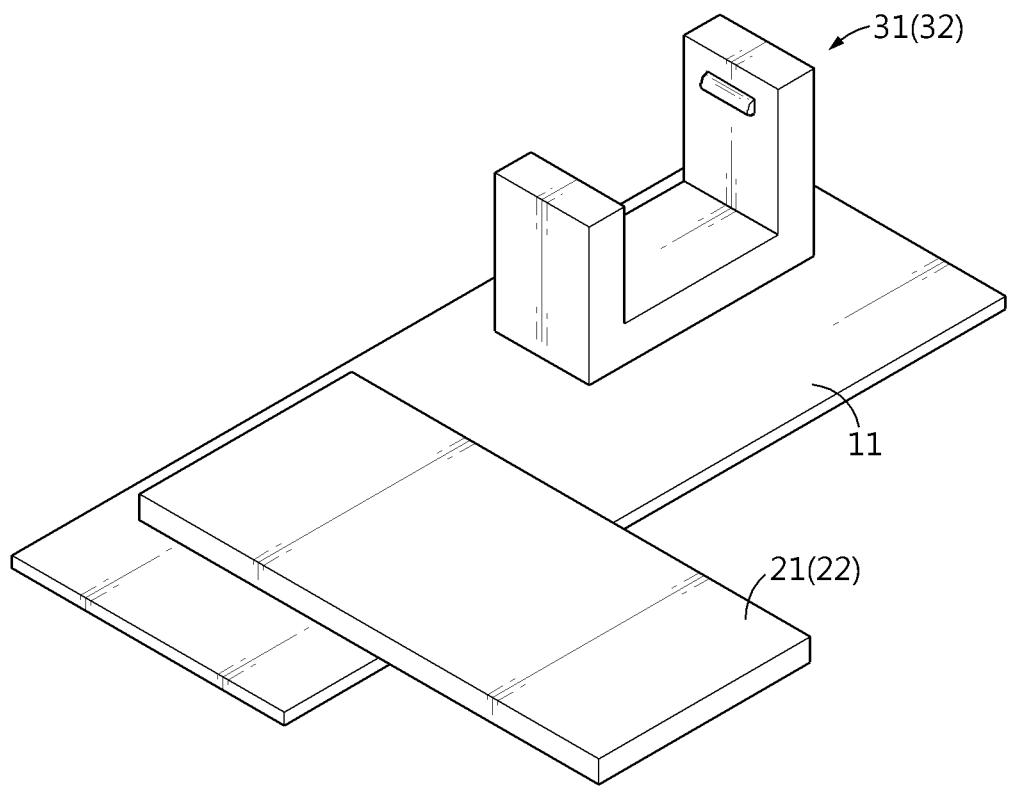
Figure 4:
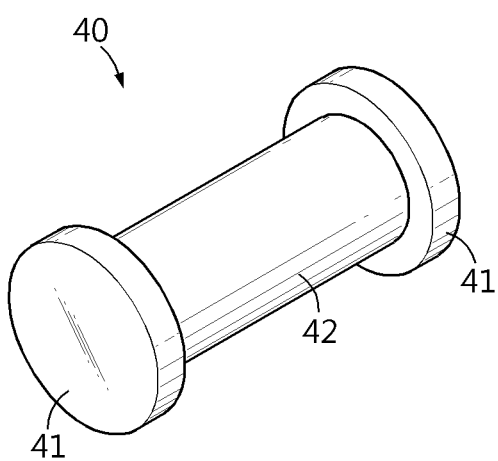
FIG. 4 is a diagram showing a connecting bar employed at the battery module according to an embodiment of the present disclosure.

FIG. 1 is a plane view showing a battery module according to an embodiment of the present disclosure, FIGS. 2 and 3 are diagrams showing a coupling pattern of an electrode lead and a single support of a socket employed at the battery module according to an embodiment of the present disclosure, and FIG. 4 is a diagram showing a connecting bar employed at the battery module according to an embodiment of the present disclosure.

First, referring to FIG. 1, the battery module according to an embodiment of the present disclosure includes a base plate 10, a plurality of battery cells 20, a plurality of sockets 30 and a plurality of connecting bars 40.

The base plate 10 is a plate made of a non-conductive material and supports and/or fixes the battery cells 20 and the sockets 30.

Any battery cell may be employed as the battery cell 20 of the present disclosure without limitation as long as a pair of electrode leads 21, 22 are drawn therefrom in the same direction. The battery cell 20 is provided in plurality, and the plurality of battery cells 20 are placed on the base plate 10 and may be fixed by an adhesive or a fixing structure and be prevented from moving.

The plurality of battery cells 20 may be arranged to form two columns. In other words, the plurality of battery cells 20 may be arranged to form a n×2 matrix (n≥2, where n is a natural number), and the figures of the present disclosure depict a case where the plurality of battery cells 20 form a 3×2 matrix as an example.

For the convenience of explanation, in the present disclosure, six battery cells shown in the figures will be distinctly referred to as a first battery cell 20a, a second battery cell 20b, a third battery cell 20c, a fourth battery cell 20d, a fifth battery cell 20e and a sixth battery cell 20f.

In a pair of battery cells 20 arranged in the same row, the electrode leads 21, 22 of the battery cells 20a, 20c, 20e arranged in the first column and the electrode leads 21, 22 of the battery cells 20b, 20d, 20f arranged in the second column extend in opposite directions. Further, the electrode leads 21, 22 of the battery cells 20a, 20c, 20e arranged in the first column and the electrode leads 21, 22 of the battery cells 20b, 20d, 20f arranged in the second column are disposed alternately in the vertical direction (the vertical direction refers to an upward and downward direction, based on FIG. 1).

Meanwhile, four electrode leads 21, 22 provided at the pair of battery cells 20 arranged in the same row are disposed in the order of the electrode lead 21 having a first polarity/the electrode lead 21 having the first polarity/the electrode lead 22 having a second polarity/the electrode lead 22 having the second polarity, from an upper side to a lower side (defined based on FIG. 1). The figures of the present disclosure only depict a case where the first electrode lead 21 having the first polarity is a positive electrode lead and the second electrode lead 22 having the second polarity is a negative electrode lead. However, the present disclosure is not limited thereto, and it is also possible that the first polarity is a negative polarity and the second polarity is a positive polarity, opposite to the above.

The socket 30 is installed on the base plate 10 and connected to the electrode leads 21, 22 directly or indirectly, and includes a first support 31 connected to the electrode leads 21, 22 of the battery cells 20a, 20c, 20e arranged in the first column and a second support 32 connected to the electrode leads 21, 22 of the battery cells 20b, 20d, 20f arranged in the second column.

The first support 31 and the second support 32 are spaced apart from each other, and thus the battery cells 20 are not electrically connected to each other while the first support 31 and the second support 32 are not connected by the connecting bar 40.

The supports 31, 32 are connected to each of the electrode leads 21, 22, except for a pair of electrode leads 21, 22 disposed at the outermost periphery. In other words, a pair of supports 31, 32 are disposed at one side and the other side of each of the electrode leads 21, 22 in the width direction, except for the pair of electrode leads 21, 22 disposed at the outermost periphery.

Referring to FIG. 2, the supports 31, 32 include a pair of sidewalls 31a and a connection portion 31b for connecting lower ends of the pair of sidewalls 31a. The connecting bar 40, explained later, is inserted into the space surrounded by the pair of sidewalls 31a and the connection portion 31b. In order to stably fix the connecting bar 40 when inserted, a fixing rib 31c having a protruding shape may be provided on the sidewall 31b.

Meanwhile, even though FIG. 2 only depicts a case where the electrode leads 21, 22 make electric connection by coming into contact with the lower end of the connection portion 31b. Alternatively, it is also possible that the electrode leads 21, 22 make electric connection by coming into contact with the sidewall 31a. In addition, the supports 31, 32 and the electrode leads 21, 22 may be electrically connected to each other by direct contact, and also, as shown in FIG. 3, the supports 31, 32 and the electrode leads 21, 22 may be electrically connected in an indirect way using a conductive pad 11 made of a conductive material and provided on the base plate 10.

Referring to FIG. 4 along with FIG. 1, the connecting bar 40 is made of a conductive material, and one side of the connecting bar 40 is inserted into the first support 31 and the other side of the connecting bar 40 is inserted into the second support 32 to electrically connect the first support 31 and the second support 32, thereby electrically connecting the battery cells 20a, 20b arranged in the same row and facing each other.

The connecting bar 40 is inserted into a part of the plurality of sockets 30 installed on the base plate 10 to connect the plurality of battery cells 20 in a serial connection pattern or a combined serial and parallel connection pattern.

As shown in FIG. 4, the connecting bar 40 may include a pair of flange portions 41 disposed at both ends thereof, and an insert portion 42 configured to connect the pair of flange portions 41 and inserted into the supports 31, 32.

Referring to FIGS. 1 and 2 along with FIG. 4, the flange portion 41 has a width greater than the width of an inner insertion space of the supports 31, 32, and the insert portion 42 has a width that corresponds to the width of the inner insertion space of the supports 31, 32.

In other words, one side of the insert portion 42 is inserted into the inner insertion space of the first support 31 and the other side of the insert portion 42 is inserted into the inner insertion space of the second support 32 to electrically connect the first support 31 and the second support 32. In particular, the flange portion 41 fixes the connecting bar 40 to prevent the connecting bar 40 from moving along the horizontal direction (parallel to the base plate 10).

Next, an electric connection pattern of the battery module according to an embodiment of the present disclosure will be described with reference to FIGS. 5 and 6.

Figure 5:
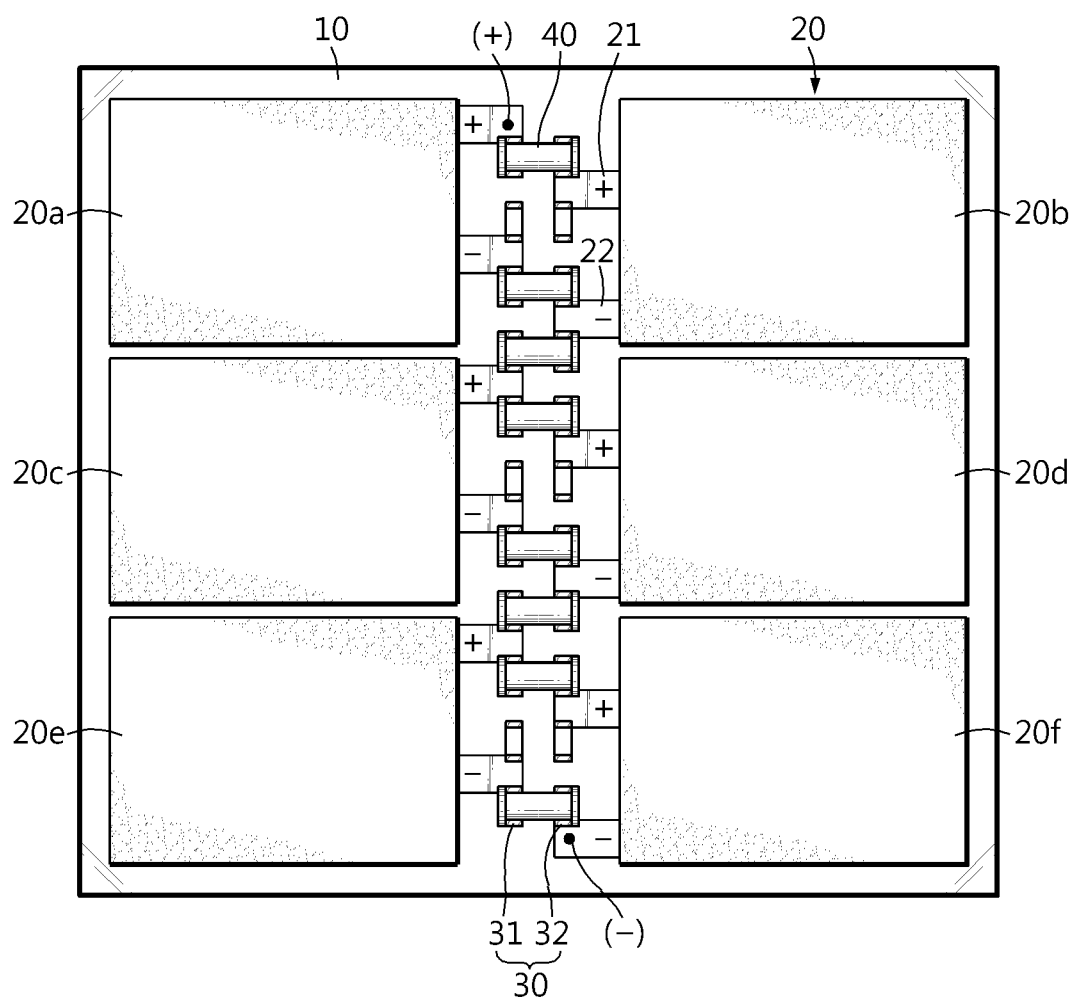
FIG. 5 is a diagram showing a case where a plurality of battery cells are connected to each other in a combined serial and parallel pattern (3S2P pattern) in the battery module according to an embodiment of the present disclosure.
Figure 6:
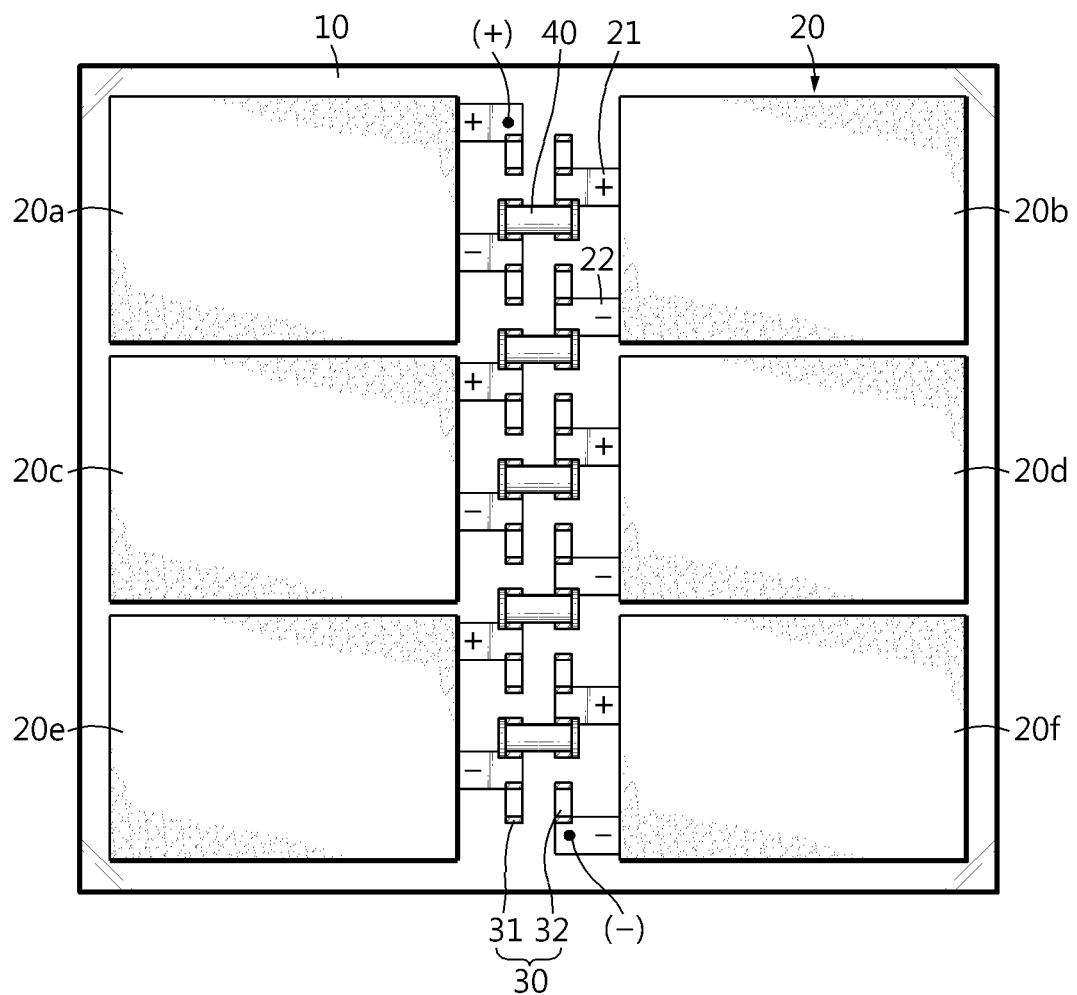
FIG. 6 is a diagram showing a case where a plurality of battery cells are connected to each other in a serial pattern (6S pattern) in the battery module according to an embodiment of the present disclosure.

FIG. 5 is a diagram showing a case where a plurality of battery cells are connected to each other in a combined serial and parallel pattern (3S2P pattern) in the battery module according to an embodiment of the present disclosure, and FIG. 6 is a diagram showing a case where a plurality of battery cells are connected to each other in a serial pattern (6S pattern) in the battery module according to an embodiment of the present disclosure.

First, referring to FIG. 5, in the battery module according to an embodiment of the present disclosure, by inserting the connecting bar 40 into a part of the plurality of sockets 30 electrically connected to the electrode leads 21, 22, it is possible to form a parallel connection between the battery cells arranged in the same row and to form a serial connection between the battery cells arranged in different rows.

In this case, the connecting bar 40 is inserted into the socket 30 disposed between the first electrode lead 21 of the first battery cell 20a and the first electrode lead 21 of the second battery cell 20b, among the battery cells 20a, 20b disposed in the first row, and is also inserted into the socket 30 disposed between the second electrode lead 22 of the first battery cell 20a and the second electrode lead 22 of the second battery cell 20b, among the battery cells 20a, 20b disposed in the first row. Accordingly, the first battery cell 20a and the second battery cell 20b have a parallel connection relation since the electrode leads having the same polarity are electrically connected to each other.

The first electrode lead 21 refers to an electrode lead having the first polarity, and the second electrode lead 22 refers to an electrode lead having the second polarity, as described above.

Meanwhile, the pair of battery cells 20c, 20d disposed in the second row and the pair of battery cells 20e, 20f disposed in the third row are also connected in parallel, similar to the first row.

Further, the connecting bar 40 is installed to connect battery cells disposed in different rows in series.

For example, the connecting bar 40 is inserted into the socket 30 disposed between the second electrode lead 22 of the second battery cell 20b disposed at the first row and the first electrode lead 21 of the first battery cell 20c disposed at the second row, thereby forming a serial connection relation between the battery cells 20a, 20b disposed in the first row and the battery cells 20c, 20d disposed in the second row.

The serial connection relation is also applied between the battery cells 20c, 20d disposed in the second row and the battery cells 20e, 20f disposed in the third row.

As described above, the battery module according to the present disclosure may have a desired electric connection relation by inserting the connecting bar 40 into a part of the sockets 30 arranged on the base plate 10, for example, a combined serial and parallel connection pattern (3S2P) as shown in FIG. 5.

Next, referring to FIG. 6, in the battery module according to an embodiment of the present disclosure, all battery cells 20a to 20f may be connected in series by inserting the connecting bar 40 into a part of the plurality of sockets 30 electrically connected to the electrode leads 21, 22.

In this case, the connecting bar 40 is inserted into the socket disposed between the second electrode lead 22 of the first battery cell 20a and the first electrode lead 21 of the second battery cell 20b, among the battery cells 20a, 20b disposed in the first row. In other words, the first battery cell 20a and the second battery cell 20b have a serial connection relation as electrode leads having different polarities are connected.

Meanwhile, the pair of battery cells 20c, 20d disposed in the second row and the pair of battery cells 20e, 20f disposed in the third row are connected in series, similar to the first row.

In addition, the connecting bar 40 is installed to connect battery cells disposed in different rows in series also.

For example, the connecting bar 40 is inserted into the socket 30 disposed between the second electrode lead 22 of the second battery cell 20b disposed in the first row and the first electrode lead 21 of the first battery cell 20c disposed in the second row, thereby forming a serial connection relation also between the battery cells 20a, 20b disposed in the first row and the battery cells 20c, 20d disposed in the second row.

The serial connection relation is also applied between the battery cells 20c, 20d disposed in the second row and the battery cells 20e, 20f disposed in the third row.

As described above, the battery module according to the present disclosure may achieve a desired electric connection relation by inserting the connecting bar 40 into a part of the sockets 30 disposed on the base plate 10. Further, depending on the selected installation position of the connecting bar 40, it is possible to achieve a combined serial and parallel connection relation as shown in FIG. 5 or a serial connection relation (6S) as shown in FIG. 6.

As described above, the battery module according to the present disclosure may selectively achieve a serial connection pattern where all battery cells 20 are connected in series or a combined serial and parallel connection pattern by inserting the connecting bar 40 into a part of the plurality of sockets 30 as desired by the user, due to the arrangement relationship of the plurality of battery cells 20 and the sockets 30 installed on the base plate 10.

Accordingly, a user may install the connecting bar 40 to connect all battery cells 20 in series in a situation where a high voltage is required, or may install the connecting bar 40 to connect the battery cells 20 in a combined serial and parallel pattern when a large capacity is required than a high voltage.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A battery module, comprising:
a base plate;
a plurality of battery cells disposed on the base plate;
a plurality of sockets electrically connected to electrode leads of the battery cells; and
a plurality of connecting bars configured to be inserted into a part of the sockets, wherein the connecting bars allow a connection pattern of the battery cells to be changed between a serial pattern and a combined serial and parallel pattern,
wherein the battery cells are arranged to form columns, and
wherein the sockets comprise:
a first support electrically connected to the electrode leads of the battery cells arranged in a first column of the columns; and
a second support electrically connected to the electrode leads of the battery cells arranged in a second column of the columns and electrically insulated from the first support.

2. The battery module according to claim 1, wherein the base plate includes a plurality of conductive pads, and
wherein the sockets are electrically connected to the electrode leads through the conductive pads.

3. The battery module according to claim 1, wherein in a pair of battery cells arranged in the same row, the electrode leads of the battery cell arranged in the first column and the electrode leads of the battery cell arranged in the second column extend in opposite directions.

4. The battery module according to claim 3, wherein the electrode leads of the battery cell arranged in the first column and the electrode leads of the battery cell arranged in the second column are disposed alternately.

5. The battery module according to claim 1, wherein each of the first support and the second support comprises:
a pair of sidewalls; and
a connection portion configured to connect lower ends of the pair of sidewalls.

6. The battery module according to claim 5, wherein the connecting bars are respectively configured to be inserted between the pair of sidewalls of both the first support and the second support to electrically connect the first support and the second support.

7. The battery module according to claim 5, wherein the connecting bars comprise:
a pair of flange portions formed at both side ends thereof to restrict a horizontal movement of the connecting bars; and
an insert portion configured to connect the pair of flange portions and inserted between the pair of sidewalls.

8. The battery module according to claim 7, wherein the insert portion has a width that corresponds to a distance between the pair of sidewalls.

9. The battery module according to claim 1, wherein when connected, the first support, the connecting bars and the second socket are aligned for the battery cells in the first column and the second column.

10. A battery module, comprising:
a plurality of battery cells;
a plurality of sockets electrically connected to electrode leads of the battery cells; and
a plurality of connecting bars configured to be inserted into a part of the sockets, wherein the connecting bars allow a connection pattern of the battery cells to be changed between a serial pattern and a combined serial and parallel pattern,
wherein the battery cells are arranged to form columns, and
wherein the sockets comprise:
a first support electrically connected to the electrode leads of the battery cells arranged in a first column of the columns; and
a second support electrically connected to the electrode leads of the battery cells arranged in a second column of the columns and electrically insulated from the first support.

11. The battery module according to claim 10, wherein each of the first support and the second support comprises:
a pair of sidewalls; and
a connection portion configured to connect lower ends of the pair of sidewalls.

12. The battery module according to claim 11, wherein the connecting bars are respectively configured to be inserted between the pair of sidewalls of both the first support and the second support to electrically connect the first support and the second support.

* * * * *